United States Patent [19]

Tanaka et al.

[11] Patent Number: 4,983,011
[45] Date of Patent: Jan. 8, 1991

[54] OPTOELECTRICAL CONNECTOR DEVICE AND OPTICAL PLUG SOCKET THEREFOR

[75] Inventors: Toshiyasu Tanaka; Nozomi Tsuzaki, both of Yokohama; Toyohiro Kobayashi, Yaizu, all of Japan

[73] Assignee: E. I. Du Pont de Nemours and Company, Wilmington, Del.

[21] Appl. No.: 438,210

[22] Filed: Nov. 20, 1989

[30] Foreign Application Priority Data

Nov. 18, 1988 [JP] Japan .................................. 63-290288

[51] Int. Cl.$^5$ .......................... G02F 1/00; H04J 14/00; G02B 6/26
[52] U.S. Cl. .................................. 350/96.20; 455/610; 370/1
[58] Field of Search ............... 350/96.10, 96.15, 96.16, 350/96.20, 96.21, 96.29; 455/610, 612, 607, 608; 370/1, 2, 3, 4

[56] References Cited

U.S. PATENT DOCUMENTS

| | | | |
|---|---|---|---|
| 4,227,075 | 10/1980 | Holland | 455/612 |
| 4,762,832 | 8/1988 | Gade et al. | 455/612 |
| 4,859,019 | 8/1989 | Bevan | 455/610 |

*Primary Examiner*—Akm Ullah

[57] ABSTRACT

An optoelectrical connector device comprising a first and a second optical terminal connected to a main optical transmission line, a third optical terminal connected to a subsidiary optical transmission line, a first and a second light receiving means, and a first and a second light emitting means. The second light receiving means and the first light emitting means are optically connected to each other, and transmit a signal to a first information processing unit and receive the processed signal from it. The second optical terminal is connected optically to the first light receiving means and the second light emitting means, and transmits a signal to the first information processing unit and receives the processed signal from it. The third optical terminal is connected optically to the first light receiving means and transmits a signal to a second information processing unit.

6 Claims, 4 Drawing Sheets

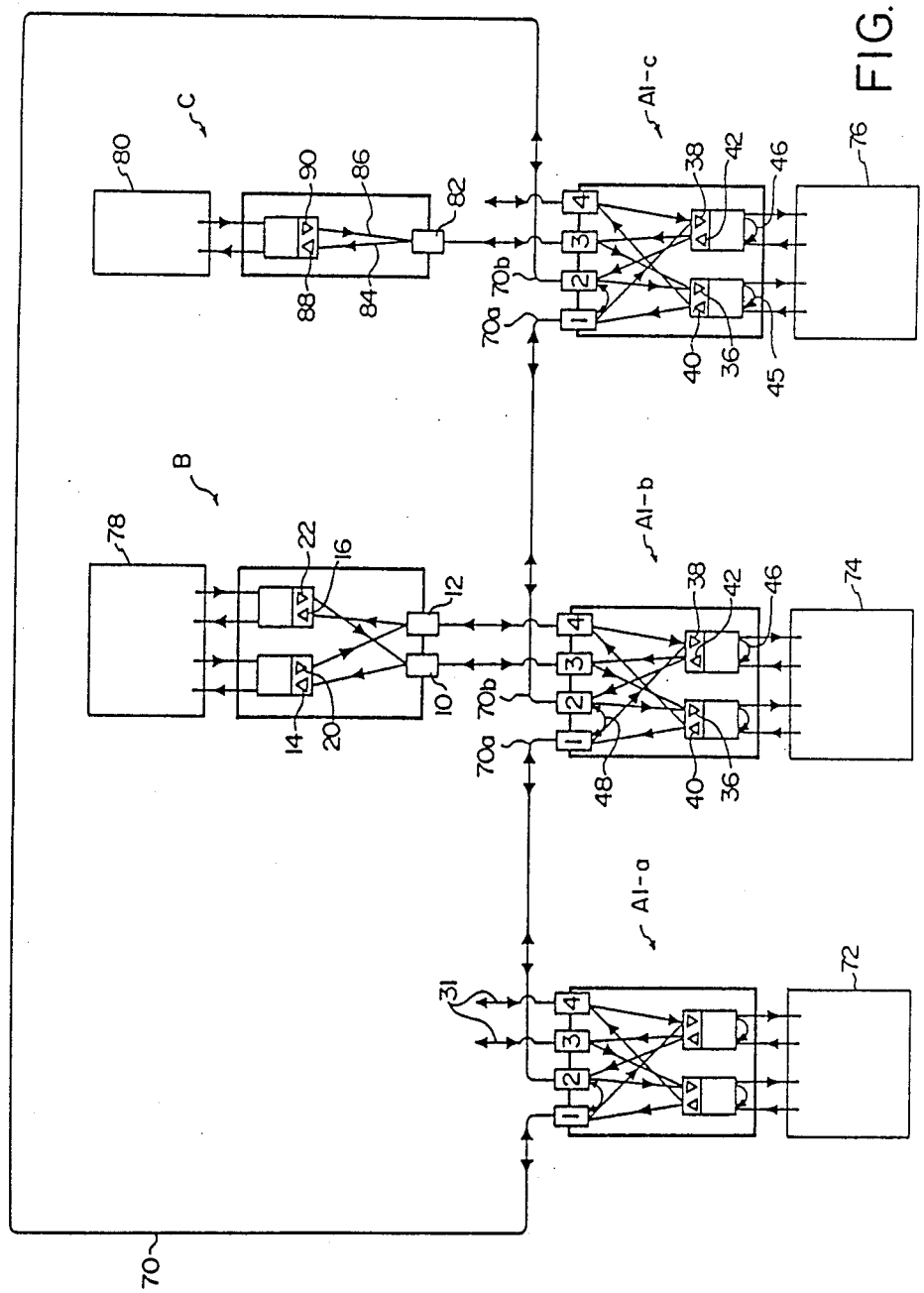
FIG. I(b)

OPTOELECTRICAL CONNECTOR DEVICE AND OPTICAL PLUG SOCKET THEREFOR

BACKGROUND OF THE INVENTION

1. Field of the Invention

This invention relates to an optoelectrical connector device and an optical plug socket. More specifically, this invention relates to an optoelectrical connector device and an optical plug socket which can be used in an optical network capable of communication in both ways by a single optical fiber between stations.

2. Description of the Prior Art

To begin with, a conventional photoelectrical connector device will be described with reference to FIG. 2.

The conventional photoelectrical connector device B shown in FIG. 2 includes, for example, a first and a second optical terminal 10 and 12 connected to a loop-like optical transmission line, a first and a second light receiving means 14 and 16 for receiving an optical signal and converting it into an electrical signal and a first and a second light emitting means 20 and 22 for receiving an electrical signal from an information processing unit 18 and converting it into an optical signal.

The first optical terminal 10 is optically connected to the first light receiving means 14 by an optical fiber 24, and an optical signal received by the first optical terminal 10 is transmitted to the first light receiving means 14. The first optical terminal 10 is connected to the second light emitting means 22 by an optical fiber 26 and the signal processed by the information processing unit 18 is transmitted to the first optical terminal 10.

The second optical terminal 12 is optically connected to the second light receiving means 16 by an optical fiber 28, and an optical signal received by the second optical terminal 12 is transmitted to the second light receiving means 16. Furthermore, the second optical terminal 12 is connected to the first light emitting means 20 by an optical fiber 30, and the signal processed by the information processing unit 18 is sent to the second optical terminal 12.

The optoelectrical connector device B can thus feed the optical signal transmitted to the first optical terminal 10 into the information processing unit 18, process it, transmit the processed signal to the second optical terminal 12, feed the optical signal sent to the second optical terminal 12 to the information processing unit 18, process it and transmit the processed optical signal to the first optical terminal 10.

Although the conventional optoelectrical connector device B can perform the desired function, it still has the following problems to be solved.

Generally, after an optical network comprised of a plurality of information processing units is built, it is frequently necessary to incorporate a new information processing unit in the optical network.

When a new information processing unit is desired to be incorporated in an optical network built from a plurality of information processing units by using the above-described optoelectrical connector device B, it is necessary, for example, to separate one information processing unit from the optical network and change the optical connecting relationship, or to break an optical transmission line in the optical network and set up the new information processing unit between the broken ends of the transmission line.

However, a change of an established optical connection frequently requires movement of the information processing units. This operation is troublesome and likely to cause an error in the optical connection.

SUMMARY OF THE INVENTION

It is an object of this invention therefore to provide an optoelectrical connector device which permits an additional optoelectrical connector device to be connected without any change of connection between an existing optoelectrical connector device and information processing units.

Another object of this invention is to provide an optical plug socket for connection to a main optical transmission line, which can be set up in a wall as is the case with general electrical plug sockets.

According to this invention, the above problems are solved by providing an optoelectrical connector device comprising a first and a second optical terminal conneected to a main optical transmission line for transmitting an optical signal data, a third optical terminal connected to a subsidiary optical transmission line forming a network for said data transmission with said main optical transmission line, a first and a second light receiving means, and a first and a second light emitting means, wherein said first optical terminal being optically connected to the second light receiving means and the first light emitting means, the second optical terminal being optically connected to to the first light receiving means and the second light emitting means, and the third optical terminal being optically connected to the first light receiving means.

The above problems are also solved in accordance with this invention by providing an optical plug socket capable of being secured to a wall, said plug comprising a first and a second optical terminal connected to a main optical transmission line, a third optical terminal connected to a subsidiary optical transmission line, a first and a second light receiving means, a first and a second light emitting means, and an outlet to be supplied with a power from an external source, wherein the first optical terminal is optically connected to the second light receiving means and the first light emitting means, the second optical terminal is optically connected to the first light receiving means and the second light emitting means, the third optical terminal is optically connected to the first light receiving means and the second light emitting means, the third optical terminal constitutes an optical signal take-out outlet removably connected to an optical plug, the first light receiving means and the first light emitting means are electrically connected to each other, and the second light receiving means and the second light emitting means are electrically connected to each other.

According to one embodiment of this invention, there is provided an optoelectrical connector device comprising a first and a second optical terminal connected to a main optical transmission line, a third optical terminal connected to a subsidiary optical transmission line, a first and a second light receiving means, and a first and a second light emitting means;

the first optical terminal is optically connected to the second light receiving means and the first light emitting means, and the second terminal is optically connected to the first light receiving means and the second light emitting means. In the embodiment, the third optical terminal is optically connected to the first light receiving means. Hence, by connecting an additional optoelectrical connector device and an additional information processing unit to the third terminal, this information processing unit can receive a signal from the main optical transmission line.

According to another embodiment, the third optical terminal is optically connected to the second light emitting means. In this embodiment, the information processing unit connected to the third optical terminal can receive a signal from the main optical transmission line and transmit a signal from the main optical transmission line.

According to another embodiment of the invention, the device further comprises a fourth optical terminal connected optically to the second light receiving means and the first light emitting means. In this embodiment, a signal can be received from one direction of the main optical transmission line, and transmitted in that one direction of the line via the third optical terminal, and a signal from the other direction of the main optical transmission line can be received and trasmitted in the other direction via the fourth optical terminal.

According to another embodiment of the invention, the first optical terminal is optically connected to the second optical terminal. In this embodiment, even when the light receiving means, the light emitting means and the information processing units are out of action, an optical signal can be transmitted mutually between the first and second optical terminals.

According to another embodiment, there is provided an optical plug capable of being secured to a wall, comprising a first and a second terminal connected to a main optical transmission line, a third optical terminal connected to a subsidiary optical transmission line, a first and a second light receiving means, a first and a second light emitting means, and an outlet to be supplied with a power from an external source; wherein the first optical terminal is optically connected to the second light receiving means and the first light emitting means, the second optical terminal is optically connected to the first light receiving means and the second light emitting means, the third optical terminal is optically connected to the first light receiving means and the second light emitting means, the third optical terminal constitutes an optical signal take-out outlet connected removably to an optical plug, the first light receiving means and the first light transmitting means are electrically connected to each other for relay of an optical signal, and the second light receiving means and the second light emitting means. In this embodiment, by connecting an electrical plug to the take-out outlet for the power supply converted from commercial power source and the optical plug to the third optical terminal, a dc voltage for driving can be obtained, and an optical signal can be received from, and transmitted to, the the main transmission line.

According to another embodiment, the device comprises a fourth optical terminal which is connected optically to the second light receiving means and the first light emitting means constituting an optical signal take-out outlet to which an optical plug is to be connected. By connecting an optical plug to the third and fourth optical terminals, optical signals from both directions of the main optical transmission line can be received, and sent out in both directions of the main optical transmission line.

BRIEF DESCRIPTION OF THE DRAWINGS

FIG. 1(b) is a diagram of an arrangement of a first network employing the optoelectrical connector device of FIG. 1(a).

DETAILED DESCRIPTION OF THE PREFERRED EMBODIMENTS

With reference to the accompanying drawings, the optoelectrical connector device in accordance with the preferred embodiments of the invention will be described in detail.

FIRST EXAMPLE

Figure 1A:
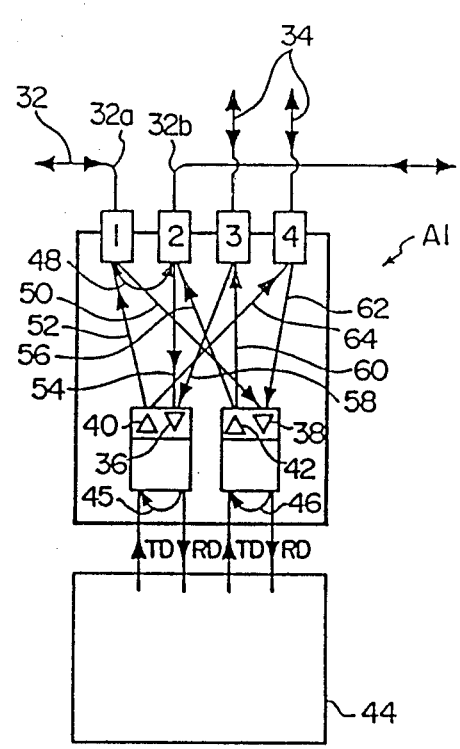
FIG. 1(a) is an illustrative diagram of an optoelectrical connector device in accordance with this invention.

With reference to FIG. 1(a), optoelectrical connector device A1 in accordance with the first example of the invention will be described.

The optoelectrical connector device A1 includes a first and a second optical terminal 1 and 2 connected to a main optical transmission line 32, and a third and a fourth optical terminal 3 and 4 connected to a subsidiary optical transmission line 34. Furthermore, it comprises a first and a second light receiving means 36 and 38 and a first and a second light emitting means 40 and 42 connected to the optical terminals 1, 2, 3 and 4 by optical fibers as described below.

The first and second light receiving means 36 and 38 receive an optical signal and convert it into an electrical signal, and feed it to an information processing unit 44. The electrical signal from the information processing unit 44 is transmitted to the first and second light emitting means 40 and 42 and converted into an optical signal.

The receiving terminals RD of the light receiving means 36 and 38 are electrically connected to the transmission terminals TD of the light emitting means 40 and 42 by means of bypass leads 45 and 46 as shown in FIG. 1(a) so that signals received by the light receiving means 36 and 38 are amplified and also transmitted to the light emitting means 40 and 42. In this example, the receiving terminals RD as output terminals of the light receiving means are electrically connected to the transmission terminals TD as input terminals of the light emitting means. But this structure is not essential, and any structure in which a signal received by the light receiving means is transmitted to the light emitting means will suffice. Preferably, an electrical signal is amplified by, for example, the light receiving means, and the amplified electrical signal is transmitted to the light emitting means.

As shown in FIG. 1(a), the first optical terminal 1 is optically connected to the second optical terminal 2 by means of an optical fiber 48. The optical fiber 48 functions as a bypass for feeding an optical signal to the main optical transmission line 32 and transmits it to an adjacent information processing unit even when a driving voltage is not fed into the light receiving means 36 and 38, light emitting means 40 and 42 or when they are out of order.

The first optical terminal 1 is further connected optically to the second light receiving means 38 by an optical fiber 50, and to the first light emitting means 40 by an optical fiber 52. The second optical terminal 2 is optically connected to the first light receiving means 36 by an optical fiber 54, and to the second light emitting means 42 by an optical fiber 56.

Accordingly, an optical signal from the left portion 32a of the main optical transmission line 32 is transmitted to the second light receiving means 38 via the first optical terminal 1 and converted into an electrical signal. The electrical signal from the second light receiving means 38 is transmitted to the information processing unit 44 and processed. The processed electrical signal is transmitted from the information processing unit 44 to the second light emitting means 42 and converted into an optical signal. The optical signal from the second light emitting means 42 is transmitted to the second optical terminal 2 via the optical fiber 6 and transmitted to the right portion 32b of the main optical transmission line 32.

The optical signal from the right portion 32b of the main optical transmission line 32 is transmitted to the first light receiving means 36 via the second optical terminal 2, and converted into an electrical signal. The electrical signal from the first light receiving means 36 is transmitted to the information processing means, and processed. The processed electrical signal is transmitted to the first light emitting means 40 and converted into an optical signal. The optical signal from the first light emitting means 40 is transmitted to the first optical terminal 1 and transmitted to the left portion 32a of the main optical transmission line.

In this manner, the optical signals from the left and right portions of the main optical transmission line 32 are transmitted to the information processing unit 44, and the signals from the information processing unit 44 are transmitted to the right and left of the main optical transmission line 32.

As shown in FIG. 1(a), the third optical terminal 3 is optically connected to the first light receiving means 36 by an optical fiber 58, and to the second light emitting means 42 by an optical fiber 60. The fourth optical terminal 4 is optically connected to the second light receiving means 38 by an optical fiber 62 and to the first light emitting means 40 by an optical fiber 64.

Accordingly, the optical signal from the left portion 32a of the main optical transmission line 32 is transmitted to the third optical terminal 3 via the first optical terminal 1, the second light receiving means 38 and the second light emitting means 42. The optical signal from the third optical terminal 3 can be transmitted to the left portion 32a of the main optical transmission line 32 via the first light receiving means 36, the first light emitting means 40 and the first optical terminal 1. Likewise, the optical signal from the right portion 32b of the main optical transmission line 32 is transmitted to the fourth optical terminal 4 and the optical signal from the fourth optical terminal 4, to the right portion 32b of the main transmission line 32.

Figure 2:
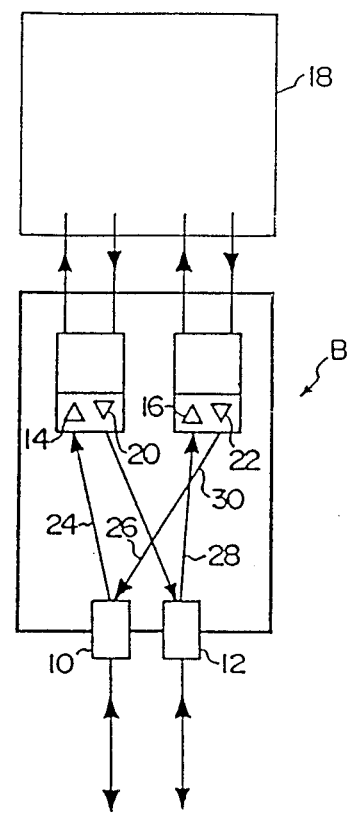
FIG. 2 is a schematical diagram showing the structure of a conventional optoelectrical connector device.

For example, as shown in FIG. 2, an optoelectrical connector device B may be connected to the third and fourth optical terminals 3 and 4 of the optoelectrical connector device A1. This permits easy expansion of the optical network.

In this example, the optical terminals, the light receiving means and the light emitting means are optically connected by optical fibers. If desired, they may also be optically connected by using other means, for example optical means using prisms, lenses and mirrors.

First Configuration of a Network Employing the Present Invention

With reference to FIG. 1(b), an applied network provided with the optoelectrical device in accordance with the first example of the invention and conventional optoelectrical connector devices will be described.

The network shown in FIG. 1(b) includes a first, a second and a third information processing unit 72, 74 and 76 connected to a main optical transmission line 70 by a first, a second and a third optoelectrical connector means A1-a, A1-b and A1-c in accordance with the first example.

Furthermore, this network further comprises the conventional optoelectrical connector device B described above with reference to FIG. 2 and connected to the second optoelectrical connector device A1-b, an information processing unit 78 connected to the optoelectrical connector device B, and a conventional optoelectrical connector device C conected to the third optoelectrical connector device A1-c, an information processing means 80 connected to the optoelectrical processing unit C and an information processing unit 80 connected to the optoelectrical connector device C.

The optoelectrical connector device A1-a comprises a first and a second optical terminal 1 and 2 connected to a main optical transmission line 70 and a third and a fourth optical terminals 3 and 4 connected to a subsidiary optical transmission line.

Since no element is connected to the third and fourth optical terminals 3 and 4 of the optoelectrical connector device A1-a, optical signals transmitted to the third and fourth optical terminals only become extinct there, and no optical signal is transmitted from the third and fourth optical terminals 3 and 4.

Accordingly, the optoelectrical connector device A1-a only functions to transmit optical signals from the left and right of the main optical transmission line 70 to the information processing unit 72, and the signals from the information processing unit 72 to the right and left of the main optical transmission line 70.

The second optoelectrical connector device A1-b has the same structure as the first optoelectrical connector device A1-a, and as shown, the procesing unit 74 is connected to it. Accordingly, as does the first optoelectrical connector device A1-a, the second optoelectrical connector device A1-b transmits an optical signal from the main optical transmission line 70 to the information processing unit 74, and the signal processed by the information processing unit 74 to the main optical transmission line 70.

The conventional optoelectrical connector device B described with reference to FIG. 2 is connected to the optical terminals 3 and 4 of the second electrical connector device A1-b.

Accordingly, an optical signal from the left portion 70a of the main optical transmission line 70 is transmitted to the first optical terminal of the optoelectrical connector device A1-b and further to the second light receiving means 38, and processed by the information processing unit 74. The processed optical signal is then transmitted through the second light emitting means 42, the third optical terminal 3, the first terminal 10, the first light receiving means 14, the information processing unit 78, the first light emitting means 20 and the second optical terminal 12 of the optoelectrical connector device 78 and also through the fourth optical terminal 4, the second light receiving means 38, the information processing unit 74 and the second light emitting means 42 of the optoelectrical device A1-b. Thus, the optical signal processed by the information processing units 74 and 78 is transmitted to the second optical terminal 2 and to the right portion 70b of the main optical transmission line 70.

On the other hand, an optical signal from the right portion 70b of the main optical transmission line 70 is transmitted to the second optical terminal 2 of the optoelectrical connector device A1-b, and then to the first light receiving means 36. The signal is then processed in the information processing unit 74 and transmitted through the first light emitting means 40, the fourth optical terminal 4 and the second optical terminal 12, the second light receiving means 16, the information processing unit 78, the second light emitting means 22 and the first optical terminal 10 of the optoelectrical connector device B and also through the third optical terminal 3, the first light receiving means 36, the information processing unit 74 and the first light emitting means 40. Thus, the optical signal processed by the information processing units 74 and 78 is transmitted to the first optical terminal, and then to the left portion 70a of the main optical transmission line 70.

In this way, the optical signal transmitted from the left portion 70a of the main optical transmission line 70 is processed by the information processing units 74 and 78 and transmitted to the right portion 70b of the main optical transmission line 70, and the optical signal transmitted from the right portion 70b is processed by the information processing units 74 and 78 and transmitted to the left portion 70a of the main optical transmission line 70.

Accordingly, the following four signals are transmitted to the second optical terminal 2 of the optoelectrical connector device A1-b.

A first signal is directly transmitted to the second optical terminal 2 from the first optical terminal 1 via the optical fiber 48. By using the optical fiber 48 optically connecting the first optical terminal 1 to the second optical terminal 2, the optical signal can be transmitted from the first optical terminal 1 to the second optical terminal 2 even when no optical signal is outputted from the light-emitting means as in the case of the electrical device being out of order or a power supply for the information processing unit being off.

A second signal is transmitted from the first optical terminal 1 to the second optical terminal 2 via the second light receiving means 38, the bypass lead 46 and the second light receiving means 42. Specifically, the signal from the first optical terminal 1 is transmitted to the second light receiving means 38, amplified, transmitted to the second light emitting means 42 via the bypass lead 46, and finally to the second optical terminal 2. So long as a driving voltage is supplied to the light receiving means 38 and the light emitting means 42, the provision of the bypass lead 46 enables the optical signal from the first optical terminal 1 to be amplified and fed to the second optical terminal 2 even when the power supply to the information processing unit 74 is off.

A third signal is transmitted to the second optical terminal 2 from the first optical terminal 1 via the information processing unit 74. Specifically, the signal from the first optical terminal 1 is transmitted to the information processing unit 74, processed there, and transmitted to the second optical terminal 2 via the second light emitting device 42.

A fourth signal is a signal transmitted from the first optical signal to the the second and fourth information processing units 74 and 78, processed and transmitted to the second optical terminal as described hereinabove.

These signals are fed into the second optical terminal 2 in the superimposed state as are the signals fed to the first optical terminal 1.

As shown, an information processing unit 76 is connected to the third optoelectrical connector device A1-c, and the signal processed by the information processing unit 76 is transmitted to the main optical transmission line 70. Furthermore, the optoelectrical connector device C to be described is connected to the third optical terminal 3 of the optoelectrical connector device A1-c.

The optoelectrical connector device C as shown includes one optical terminal 82, and a light receiving means 88 and a light emitting means 90 connected to the optical terminal 84 by means of optical fibers 84 and 86. The optical terminal 82 transmits an optical signal received to the light receiving means via the optical fiber 84. The light receiving means 88 converts the optical signal into an electrical signal and transmits it to the information processing unit 80. The electrical signal processed by the information processing unit 80 is transmitted to the light emitting means 90, converted into an optical signal and transmitted to the optical terminal via the optical fiber 86.

Since the optical terminal 82 of the optoelectrical connector device C is connected to the third terminal 3 of the optoelectrical connector device A1-c, a signal from the left portion 70a of the main optical transmission line 70 is transmitted to the first optical terminal 1 of the optoelectrical connector device A1-c and to the second light receiving means 38. The signal is then transmitted through the information processing unit 76 or the bypass lead 46, also through the second light emitting means 42, the third optical terminal 3, and the optical terminal 82, the light receiving means 88, the information processing unit 80, the light emitting means 90 and the optical terminal of the optoelectrical connector device C, and further through the third optical terminal 3, the first light receiving means 36, the information processing unit 76 or the bypass lead 45, the first light emitting means 40 of the optoelectrical connector device A1-c. Thus, the optical signal processed by the information processing units 76 and 80 is transmitted to the first optical terminal 1 and then to the right portion 70b of the main optical transmission line 70.

When the optical terminal 82 of the optoelectrical connector device C is connected to the fourth optical terminal 4 of the optoelectrical connector device A1-c, the information processing unit 80 connected to the optoelectrical connector device C receives the optical signal from the right portion 70b of the main optical transmission line 70, processes it, and transmits the processed optical signal to the right portion 70b of the main transmission line.

Since this applied network is constructed as described above, it permits transmission of an optical signal through the main optical transmission line 70 in both directions.

As required, means for extinguishing the optical signal in the amin optical transmission line 70 may be provided in one information processing unit so that the unwanted optical signal may be extinguished.

SECOND EXAMPLE

Now, an optoelectrical connector device in accordance with the second example which is to be installed on a wall will be described.

Figure 3:
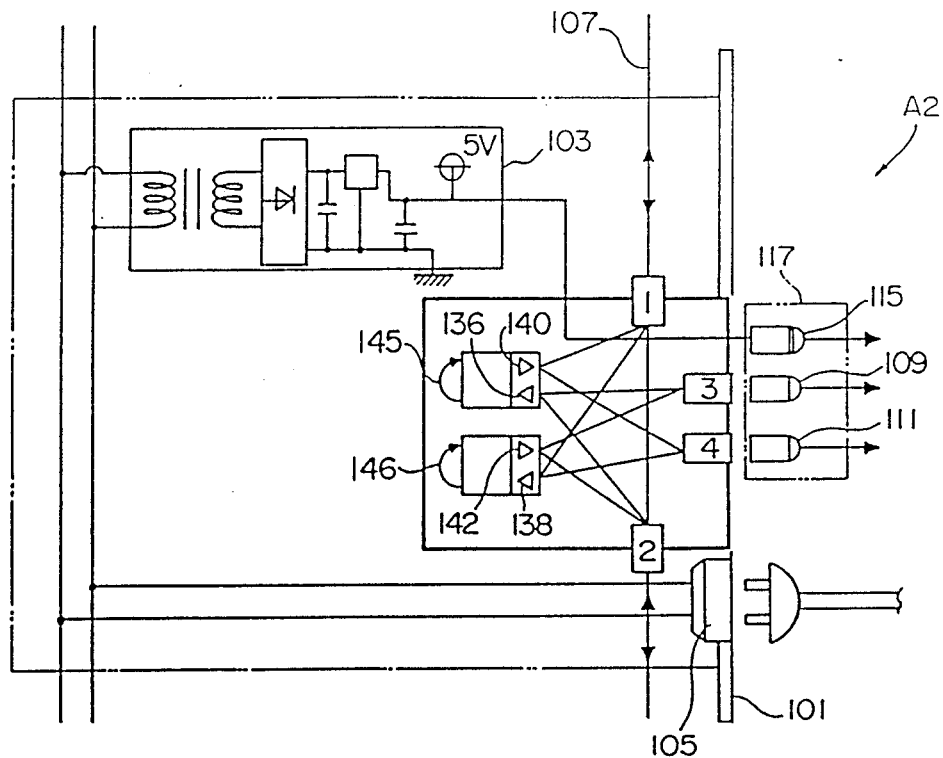
FIG. 3 is a schematical diagram showing the structure of an optoelectrical connector device in accordance with a second example of the invention.

FIG. 3 shows an ac-dc converter 103 for supplying a dc voltage, an optoelectrical connector device A2 in accordance with the second example of this invention, and a plug socket 105 for a commercial power supply, which are installed in a wall 101. The ac-dc converter 103 is connected to, for example, a commercial 100 V ac power supply and supplies a dc power supply of 5 V or 24 V. Preferably, these members are constructed as one module for easy installation.

The optoelectrical connector device A2 has the same optical connecting relationship as the optoelectrical connector devices A1-a, A1-b and A1-c in accordance with the first example of the invention described above with reference to FIGS. 1(a) and 1(b). Specifically, a first optical terminal 1 of the optoelectrical connector device A2 is optically connected to a second optical terminal 2, a second light receiving means 138 and a first light emitting means 140. The second optical terminal is optically connected to the first optical terminal, a first light receiving means 136 and a second light emitting means 142. A third optical terminal is optically connected to the first light receiving means 136 and the second light emitting means 142. A fourth optical terminal 4 is optically connected to the second light receiving means 138 and the first light emitting means 140.

The first and second optical terminals of the optoelectrical connector device A2 are connected to a main optical transmission line 107, for example, the main optical transmission line 10 of FIG. 2 or the main optical transmission line of FIG. 1(b).

The third and fourth optical terminals 3 and 4 are set up in the wall 101 and adapted to be connected to exterior optical plugs 109 and 111. These optical plugs 109 and 111 may be connected to an information processing unit via a standard interface such as RS-232C or RS-4222.

The first light receiving means 136 and the first light emitting means 140 are electrically connected by a bypass lead 145. Thus, the optical signal received by the first light receiving means 136 is amplified and transmitted by the first light emitting means 140. The optical signal received by the second light receiving means 138 is likewise amplified and transmitted to the second light emitting means 142 via a bypass lead 146.

No information processing unit is connected to the first and second light receiving means 136 and 138 and the first and second light emitting means 140 and 142.

The optoelectrical connector device A2 is equipped with the ac-dc converter 103. A dc voltage plug socket connected to an output from the ac-dc converter 103 is disposed adjacent to the third and fourth optical terminals 3 and 4. An electrical plug 115 can be connected to the dc plug socket.

By disposing the dc voltage plug socket adjacent to the third and fourth optical terminals 3 and 4 an optoelectrical combined plug socket 117 is constructed of optical plugs 109 and 111 and an electrical plug 115, which may thus be connected to the third and fourth optical terminals 3 and 4.

Since the optoelectrical connector device A2 in accordance with the second example has the above-described structure, an optical signal transmitted to the first optical terminal 1 from the main optical transmission line 107 is directly transmitted to the second optical terminal 2 and amplified by the light receiving means 138 and sent to the second optical terminal 2. An optical signal is transmitted likewise from the second optical terminal 2 to the first optical terminal 1.

The optical signal transmitted to the first optical terminal is transmitted to the third optical terminal 3 via the second light receiving means 138 and the second light emitting means 142. The optical signal from the third optical terminal 3 is transmitted to the first optical terminal 1 via the first light receiving means 136 and the first light emitting means 140. Likewise, the optical signal transmitted to the second optical terminal 2 is transmitted to the fourth optical terminal 4, and the signal from the fourth optical terminal 4 is transmitted to the second optical terminal 2.

Accordingly, by connecting the optical plug 109 to the third optical terminal 3, the optical signal transmitted to the first optical terminal 1 can be received and an optical signal can be transmitted to the first optical terminal 1. Likewise, by connecting the optical plug 111 to the fourth terminal 4, the optical signal transmitted to the second optical terminal 2 can be received, and an optical signal can be transmitted to the second optical terminal 2.

Second Configuration of a Network Employing the Present Invention

Figure 4:
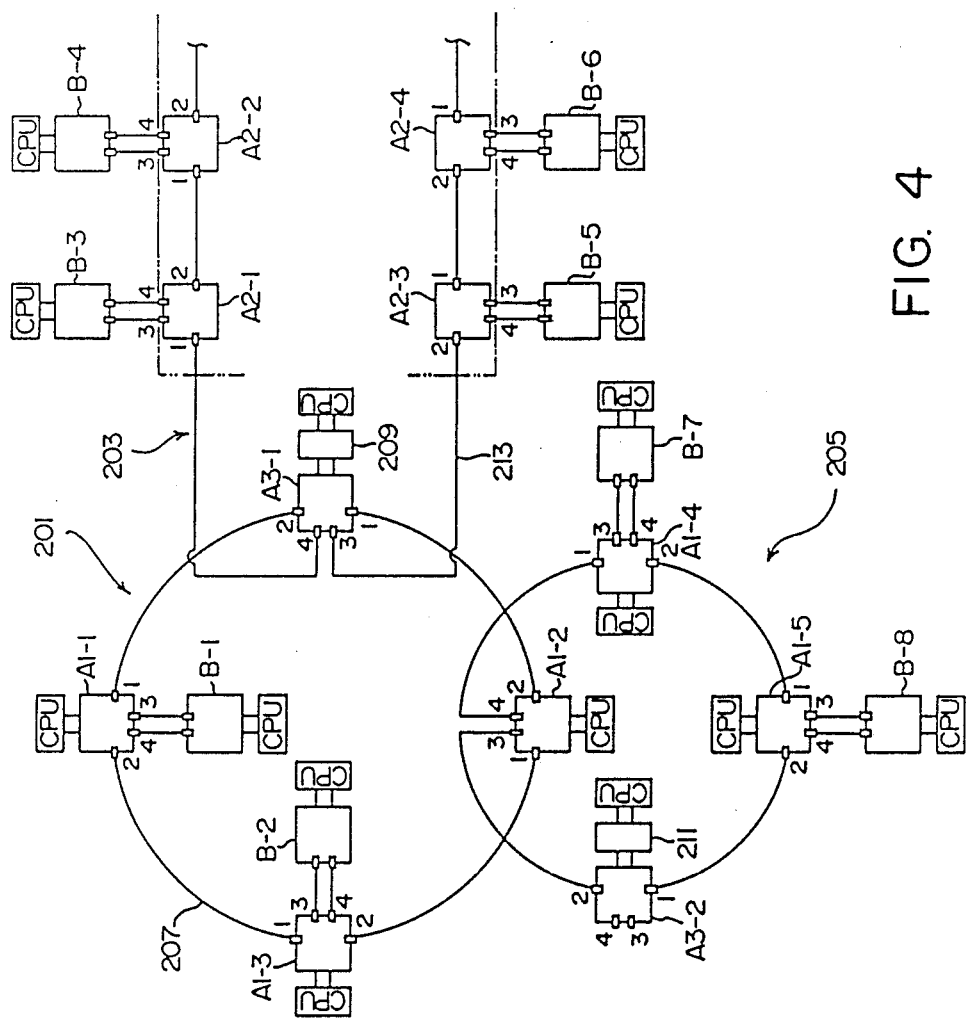
FIG. 4 is a schematical diagram showing an arrangement of a second network to which the optoelectrical connector device of FIG. 3 is applied.

With reference to FIG. 4, a second applied network including the optoelectrical connector devices of the invention described above and the conventional optoelectrical connector device will be described.

The applied network shown in FIG. 4 comprises a first loop 201, an auxiliary line 203 connected to the first loop 201 and a second loop 205.

The first loop 201 includes optoelectrical connector devices A1-1, A1-2 and A1-3 in accordance with the first example of the invention described above with reference to FIGS. 1(a) and 1(b), conventional optoelectrical connector device B-1 and B-2 described above with reference to FIG. 2 and an optoelectrical connector device A3-1 in accordance with a modified embodiment of the first example.

The optoelectrical connector device A3-1 in accordance with the modified embodiment of the first example differs from the optoelectrical connector device A1 in accordance with the first example in that the first optical terminal 1 and the second optical terminal 2 are not optically connected [namely, the optical fiber 48 shown in FIG. 1(a) is not provided] and that the light receiving means 36 and 38 and the light emitting means 40 and 42 are not electrically connected [namely, the bypass leads 45 and 46 in FIG. 1(a) are not provided]. In other words, no means for transmitting a transmitted optical signal to an adjacent station without going through an information processing unit is provided in the optoelectrical connector device A3-1.

The first optoelectrical connector means A1-1 is connected to an information processing unit CPU and connected to the a main optical transmission line 207 of the first loop 201 at the first and second optical terminals 1 and 2. Furthermore, the first optoelectrical connector device A1-1 is connected at the third and fourth optical terminals 3 and 4 to the optoelectrical connector device B-1 which, as shown, is connected to an information processing unit CPU.

The second optoelectrical connector device A3-1 is an optoelectrical connector device in accordance with the modified embodiment, and is connected to an information processing unit CPU via an optical loop stop circuit 208. Accordingly, the second optoelectrical connector device A2-1 can have an incoming optical signal terminate therein. The second optoelectrical connector device A3-1 is connected to a main optical transmission line 207 at the first and second optical terminals 1 and 2, and to the auxiliary line 203 at the third and fourth optical terminals 3 and 4.

The third optoelectrical connector means A1-2 is connected to an information processing unit CPU and also connected to the main optical transmission line 207 at the first and second optical terminals 1 and 2 and to the second loop 205 at the third and fourth optical terminals 3 and 4.

The fourth optoelectrical connector device A1-3 is connected to an information processing unit CPU and also connected to the main optical transmission line 207 at the first and second optical terminals 1 and 2 and to the optoelectrical connector device B-2 at the third and fourth optical terminals 3 and 4. The optoelectrical connector device B-3 is connected to an information processing unit CPU as shown.

By the above-mentioned connections, each of the information processing units CPU constituting the first loop 201 can receive both an optical signal transmitted counterclockwise through the main optical transmission line 207 and an optical signal transmitted clockwise through the main optical transmission line 207, and transmit a signal both counterclockwise and clockwise in the main transmission line 207.

The auxiliary line 203 includes a fifth optoelectrical connector device A2-1 connected to the second optoelectrical connector device A3-1, a sixth optoelectrical connector device A2-2 connected to the fifth optoelectrical connector device A2-1, a seventh optoelectrical connector device A2-3 connected to the second optoelectrical connector device A3-1, and an eighth optoelectrical connector device A2-4 connected to the seventh optoelectrical connector device A2-3, and further the conventional optoelectrical connector devices B-3 to B-6 described with reference to FIG. 2 and connected to the aforesaid optoelectrical connector devices.

The fifth to eighth optoelectrical connector devices A2-1 to A2-4 are the optoelectrical connector devices in accordance with the second example of this invention described hereinabove with reference to FIG. 3.

The fifth optoelectrical connector device A2-1 is connected to the fourth optical terminal of the second optoelectrical connector device A3-1 at the first optical terminal 1, to the optoelectrical connector device A2-2 at the second optical terminal 2, and to the optoelectrical connector device B-3 at the third and fourth optical terminals 3 and 4. The optoelectrical connector device B-3 is connected to an information processing unit CPU as shown.

The optoelectrical connector device A2-2 is connected to the optical terminal 3 of the optoelectrical connector device A2-1 at the optical terminal 1 and to the optoelectrical connector device B-3 at the optical terminals 3 and 4. The optoelectrical connector device B-3 is connected to the information processing unit CPU. The optical terminals of the optoelectrical connector device A2-2 are connected to an optoelectrical connector device and an information processing unit (both not shown).

The optoelectrical connector device A2-3 is connected to the optical terminal 3 of the optoelectrical connector device A-31 at the optical terminal 2, to the optoelectrical connector device A2-4 at the optical terminal 1, and to the optoelectrical connector device B-5 at the optical terminals 3 and 4. The optoelectrical connector means B-5 is connected to an information processing unit CPU as shown.

The optoelectrical connector device A2-4 is connected to the optical terminal 1 of the optoelectrical connector device A2-3 and to the optoelectrical connector device B-6 at the optical terminals 3 and 4. The optoelectrical connector device B-6 is connected to an information processing unit CPU as shown. The optical terminal 1 of the optoelectrical connector device A2-4 is connected to an optoelectrical connector device and an information processing unit (both not shown).

These optoelectrical connector devices A2-1 to A2-4 are arranged in a wall 213, and the optical terminals 3 and 4 of these devices are exposed exteriorly of the wall as optical signal take-out outlets. As shown, these optical terminals 3 and 4 are connected to the optoelectrical connector devices B-3 to B-6 by means of optical connectors having an optical plug.

By such connections, the optoelectrical connector device A3-1 is connected to the optoelectrical connector device as A2-1 and A2-3, and signal processing devices A2-1 to A2-4 can receive an optical signal transmitted in the first loop 201. The information processing units CPU constituting the first loop 201 can receive optical signals from the information processing units CPU constituting the auxiliary line 203 and transmit them to an auxiliary optical transmission line.

The second loop 205 includes an optoelectrical connector device A1-4 connected to a third optoelectrical connector device A1-2, an optoelectrical connector device A1-5 connected to the optoelectrical connector device A1-4 and an optoelectrical connector device A3-2 connected to the optoelectrical connector devices A1-5 and A1-2 and also conventional optoelectrical connector devices B-7 and B-8 described with reference to FIG. 2.

The optoelectrical connector device A1-4 is an optoelectrical connector device in accordance with the first example. It is connected to the optical terminal 2 of the optoelectrical connector device A1-2 at its first optical terminal 1, to the optoelectrical connector device A1-5 at its optical terminal 2, and to the optoelectrical connector device B-7 at the optical terminals 3 and 4.

The optoelectrical connector device A1-5 is an optoelectrical connector device in accordance with the first example, and is connected to the optical terminal 3 of the optoelectrical connector device A1-4, to the optoelectrical connector device A-2 at this optical terminal, and to the optoelectrical connector device B-8 at the optical terminals 3 and 4.

The optoelectrical connector device A3-2 is in accordance with the modified embodiment of the first example described above, and is connected to an information processing unit CPU via an optical loop stop circuit 211. Hence, the optoelectrical connector device A3-2 can have a transmitted signal terminate therein. The optoelectrical connector device A3-2 can be connected to the optical terminal 2 of the optoelectrical connector device A1-4 at the first optical terminal 1 and to the optical terminal 1 of the optoelectrical connector device A1-2 at the optical terminal 2.

By the above-described connections, the information processing units disposed in the first loop 201, the auxiliary line 203 and the second loop 205 can receive optical signals from both directions of the loops and line and transmit them in both directions.

As stated hereinabove, the present invention permits connection of an additional optoelectrical connector device to an optical network without changing optoelectrical connector devices and information processing units already incorporated in the network, and makes it easy to expand the system.

The present invention can also provide an optical plug socket for connection to a main optical transmission line, which can be set up in a wall as is the case with general electrical plug sockets.

The technical advantages achieved by this invention are summarized as follows:

(a) By using a single optical fiber, communication in both directions is possible.
(b) Full duplex operation is possible.
(c) The signal transmitting and receiving direction can be selected by selecting the optical terminals (for example, when transmission and receiving are performed in two directions, transmission and receiving are directed to both of them).
(d) The optical plug socket of this invention constructed as a unit with a power supply makes it possible to provide a common power supply system for signal relay among all stations in a room or a building, and obviate the need to set up a power supply for every station.

We claim:

1. An optoelectrical connector device comprising:
   first and second optical terminals optically intercepting and respectively optically connected to a main optical transmission line for communicating optical signals between a plurality of information processing units which are each optically connected to said main optical transmission line,
   a third optical terminal optically connected to a subsidiary optical transmission line for communicating optical signals between an external processing unit and said plurality of information processing units optically connected to said main optical transmission,
   photoelectric conversion means for converting between electrical and optical signals having first and second light receiving means for converting optical signals to electrical signals and first and second light emitting means for converting electrical signals to optical signals, said photoelectric conversion means being electrically connected to one of said plurality of information processing units and optically connected to said main optical transmission line,
   wherein the first optical terminal is optically connected to the second light receiving means and first light emitting means, the second optical terminal is optically connected to the first light receiving means and the second light emitting means, and the third optical terminal is optically connected to the first light receiving means.

2. The optoelectrical connector device of claim 1 in which the third optical terminal is optically connected to the second light emitting means.

3. The optoelectrical connector device of claim 1 or 2 which further comprises a fourth optical terminal connected optically to the second light receiving means and the first light emitting means.

4. The optoelectrical connector device of claim 3 in which the first optical terminal is optically connected to the second optical terminal.

5. An optical plug socket comprising a first and a second optical terminal optically connectible to a main optical transmission line for communicating optical signals between a plurality of information processing units which are optically connected to said main optical transmission line, a third optical terminal optically connectible to a subsidiary optical transmission line, a first and a second light receiving means for converting optical signals to electrical signals, a first and a second light emitting means for converting electrical signals to optical signals, and an outlet to be supplied with a power from an external source, wherein
   the first optical terminal is optically connected to the second light receiving means and the first light emitting means,
   the second optical terminal is optically connected to the first light receiving means and the second light emitting means,
   the third optical terminal is optically connected to the first light receiving means and the second light emitting means,
   the third optical terminal constitutes an optical signal take-out outlet removably connected to an optical plug,
   the first light receiving means and the first light emitting means are electrically connected to each other, and
   the second light receiving means and the second light emitting means are electrically connected to each other.

6. The optical plug socket of claim 5 which further comprises a fourth optical terminal which is connected optically to the second light receiving means and the first light emitting means and constitutes the optical signal take-out outlet to be connected to the optical plug.

* * * * *